(12) United States Patent
Shibao

(10) Patent No.: US 8,482,773 B2
(45) Date of Patent: Jul. 9, 2013

(54) IMAGE READING APPARATUS AND METHOD OF CONTROLLING THE APPARATUS, AND STORAGE MEDIUM

(75) Inventor: Koki Shibao, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 573 days.

(21) Appl. No.: 12/782,149

(22) Filed: May 18, 2010

(65) Prior Publication Data

US 2010/0321728 A1    Dec. 23, 2010

(30) Foreign Application Priority Data

Jun. 23, 2009   (JP) ................. 2009-149181

(51) Int. Cl.
*G06F 3/12* (2006.01)
*G06F 3/00* (2006.01)
*H04N 1/46* (2006.01)
*H04N 1/04* (2006.01)

(52) U.S. Cl.
USPC ......... 358/1.15; 358/1.13; 358/505; 358/474; 358/1.1; 715/700; 715/733; 715/745; 715/747

(58) Field of Classification Search
None
See application file for complete search history.

(56) References Cited

U.S. PATENT DOCUMENTS

| | | | | |
|---|---|---|---|---|
| 6,459,499 B1* | 10/2002 | Tomat | | 358/1.15 |
| 2002/0085244 A1* | 7/2002 | Blasio et al. | | 358/474 |
| 2007/0183002 A1* | 8/2007 | Corona | | 358/474 |
| 2008/0079985 A1* | 4/2008 | Ferlitsch | | 358/1.15 |

FOREIGN PATENT DOCUMENTS

JP   2005-244754 A   9/2005

* cited by examiner

*Primary Examiner* — Thomas Lett
(74) *Attorney, Agent, or Firm* — Fitzpatrick, Cella, Harper & Scinto

(57) ABSTRACT

The invention relates to an image reading apparatus and to a method of controlling this apparatus. The image reading apparatus acquires a profile capable of being set as processing applied to image data in an information processing device, re-classifies, for the purpose of display on the image reading apparatus, the name of the acquired profile and the settings of the profile, converts this profile name and the settings to items displayed on a display unit of the image reading apparatus, and displays the items on the display unit. The information of a profile selected based upon an item displayed on the display unit is transmitted to the information processing device, and the image data generated by the image reading apparatus is transmitted to the information processing device in response to a request from the information processing device.

9 Claims, 7 Drawing Sheets

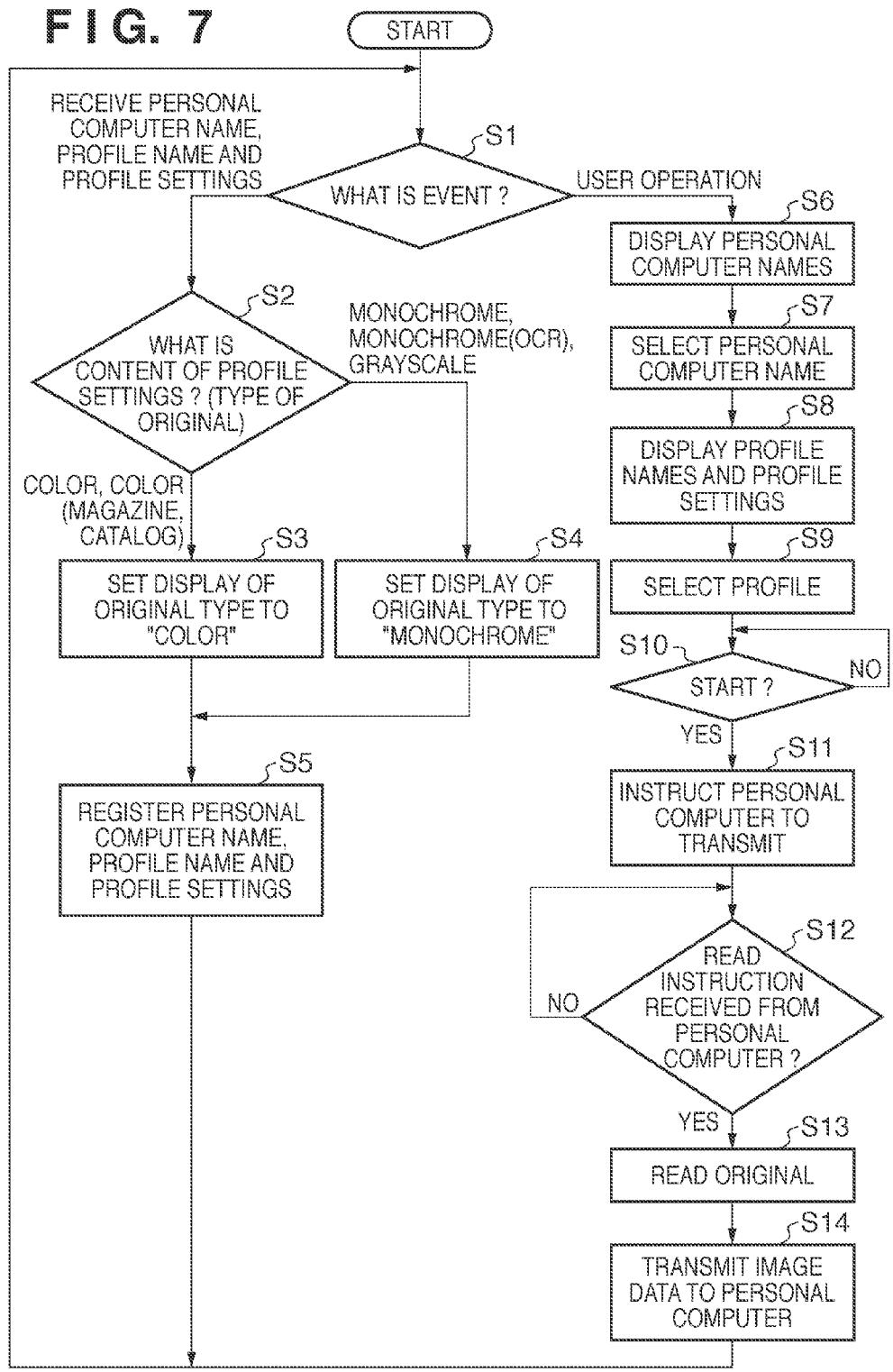

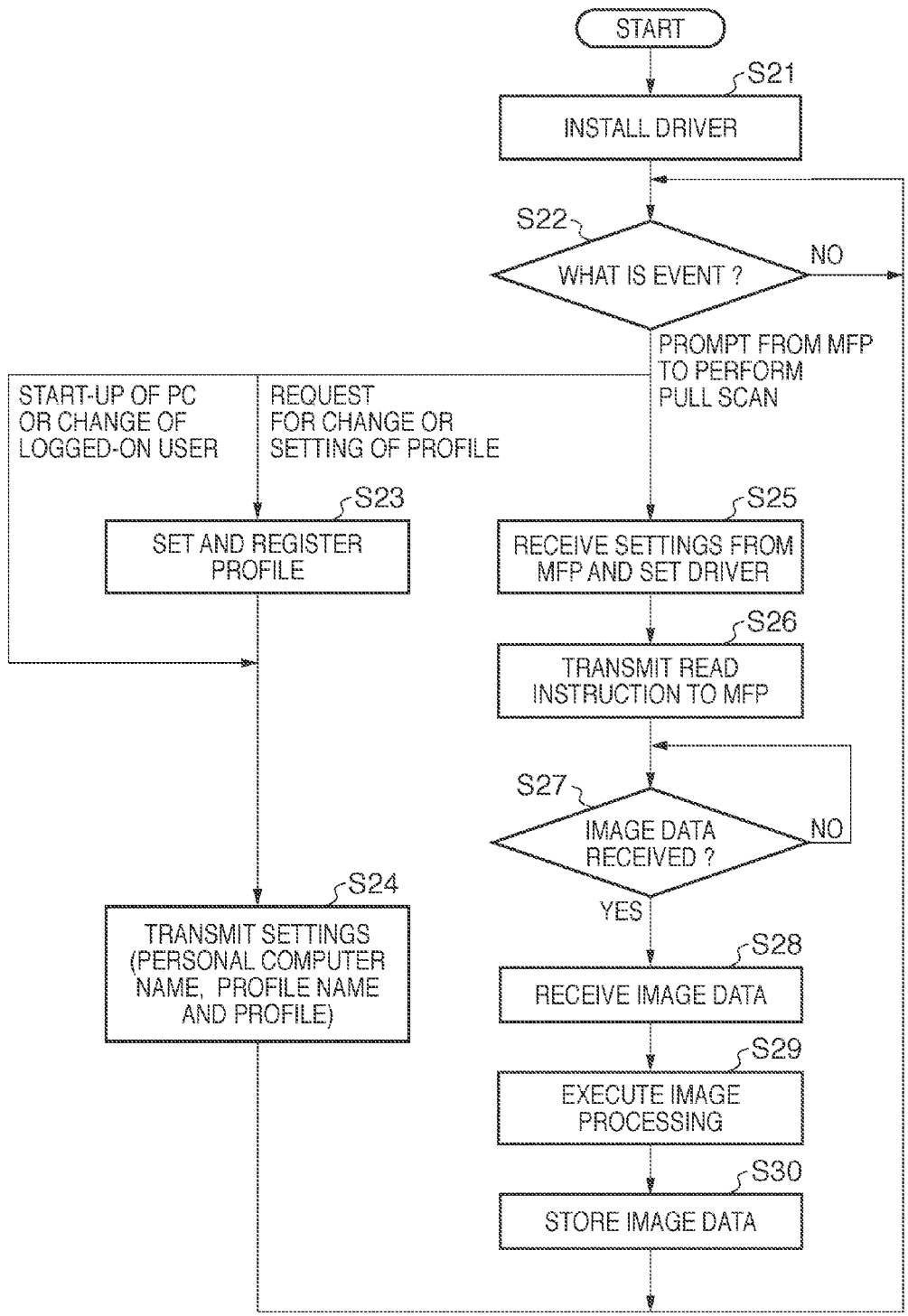

IMAGE READING APPARATUS AND METHOD OF CONTROLLING THE APPARATUS, AND STORAGE MEDIUM

BACKGROUND OF THE INVENTION

1. Field of the Invention

The present invention relates to an image reading apparatus capable of implementing a pseudo-push-scan function that utilizes a pull-scan function in cooperation with an information processing device, a method of controlling this apparatus, and a storage medium for the same purpose.

2. Description of the Related Art

Inexpensive scanners and MPFs (multifunction peripherals) now often use a pseudo-push-scan method (a method using a host personal computer and a driver) when transmitting image data that has been read in by scanning. In the case of an MFP, the pseudo-push-scan method is one in which the MFP issues a request "CAUSE LOCAL DEVICE TO EXECUTE PULL SCAN" to a personal computer in which a pull-scan driver has been installed, and the personal computer responds by causing the MFP to perform scanning. The personal computer processes image data, which has been accepted from the MFP, based upon an image processing method that was designated at the time of the pull scan, and stores the processed image data at a prescribed storage destination. By following this procedure, it is possible for the image data to be transmitted from the MFP to the personal computer in a desired format in accordance with an instruction from the MFP, and push scan from the MFP can be implemented in the form of a pseudo-push scan. Further, in comparison with push scan performed by the MFP (namely a method of transmitting scanned-in image data from the MFP to the personal computer without the inclusion of any operation performed on the side of the personal computer), the pseudo-push-scan method is advantageous for the following reasons:

- Since it is unnecessary for several protocols to be supported on the MFP side, the cost of the MFP can be held down.
- Troublesome network settings on the MFP side are unnecessary and user friendliness is enhanced as a result.

Further, in the case where the pseudo-push-scan operation is executed from the MFP side, the user performs an operation that consists of selecting what is desired from among choices, which are displayed on the control panel of the MFP, corresponding to the names of personal computers and scan-parameter sets (referred to as "profiles" below) on the side of the personal computers.

On the other hand, in a case where an image-data transmission or the like is performed from the MFP using a resource or capability of another device (personal computer), there is a need for the MFP to be able to determine which functions are usable by this other personal computer. In order to satisfy this need, the specification of Japanese Patent Laid-Open No. 2005-244754, for example, proposes technology for prohibiting an e-mail operation on the side of an MFP in a case where an e-mail transmission cannot be performed by a personal computer.

Thus, since pseudo-push scan is implemented by a pull scan from the personal computer, it is required that a profile relating to the format of the image data transmitted be set by the personal computer beforehand. At the MFP, on the other hand, scanning is executed upon selecting a profile using the user interface of the MFP. However, there are instances where the display of profiles is a display of names fixed in advance or of profile names only. As a consequence, it is difficult for the user to determine what the settings of these profiles are, and there is no method available whereby the user at the MFP can check, before a scan is actually executed, what kind of image data will be obtained at the personal computer when the scan is executed using the profile. In terms of the example of the prior art, even if an MFP is capable of discriminating that a personal computer is in a state in which it can transmit e-mail, in what file format image data will be transmitted by this e-mail cannot be determined from the user interface of the MFP. Accordingly, if pseudo-push scan is executed by an MFP upon selecting a profile of the wrong format, the user will first notice the mistake only after observing the image data that has been accepted by the personal computer. In such case it is necessary to repeat the selection of the profile at the MFP and the checking of the image data at the personal computer. The result is very poor operability.

SUMMARY OF THE INVENTION

An aspect of the present invention is to eliminate the above-mentioned problems with the conventional technology.

The present invention facilitates processing, which is executed between an information processing device and an image reading apparatus, for confirming settings by arranging it so that profiles capable of being set by the information processing apparatus, as well as the content of profile settings, can be confirmed by the image reading apparatus.

According to an aspect of the present invention, there is provided an image reading apparatus comprising:

a reading unit configured to read an original and generate image data representing the original;

a communication unit configured to communicate with an information processing device;

an acquisition unit configured to acquire, by using the communication unit, a profile capable of being set as processing for reading the original and generating the image data by the reading unit and transmitting the generated image data;

a display control unit configured to re-classify settings of the profile, which has been acquired by the acquisition unit, for the purpose of display on a display unit of the image reading apparatus, and to cause an item that has been generated based upon the re-classified settings to be displayed on the display unit;

a transmission unit configured to, based upon selection of the item displayed on the display unit by the display control unit, transmit information of the profile corresponding to this item to the information processing device; and an image transmission unit configured to transmit the image data generated by the reading unit to the information processing device in accordance with a request, which is transmitted from the information processing device, for transmission of the image data.

According to another aspect of the present invention, there is provided a method of controlling an image reading apparatus capable of implementing pseudo-push scan in cooperation with an information processing device, comprising:

a reading step of reading an original and generating image data representing the original;

an acquisition step of acquiring, by using a communication unit, a profile capable of being set with regard to processing for reading the original and generating the image data in the reading step and transmitting the generated image data;

a display control step of re-classifying settings of the profile, which has been acquired in the acquisition step, for the purpose of display on a display unit of the image reading apparatus, and causing an item that has been generated based upon the re-classified settings to be displayed on the display unit;

a transmission step, based upon selection of the item displayed on the display unit in the display control step, of transmitting information of the profile corresponding to this item to the information processing device; and an image transmission step of transmitting the image data generated in the reading step to the information processing device in accordance with a request, which is transmitted from the information processing device, for transmission of the image data.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIG. 7 is a flowchart describing processing executed by an MFP according to this embodiment; and FIG. 8 is a flowchart describing processing executed by a personal computer according to this embodiment.

DESCRIPTION OF THE EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

It should be noted that although an image reading apparatus according to the present invention is described by referring to a multifunction peripheral (MFP) in this embodiment, the present invention is not limited to an MFP. For example, the image reading apparatus may be a scanner for reading the image of an original and generating image data, or a printer or facsimile machine having a scanner function, etc.

Figure 1:
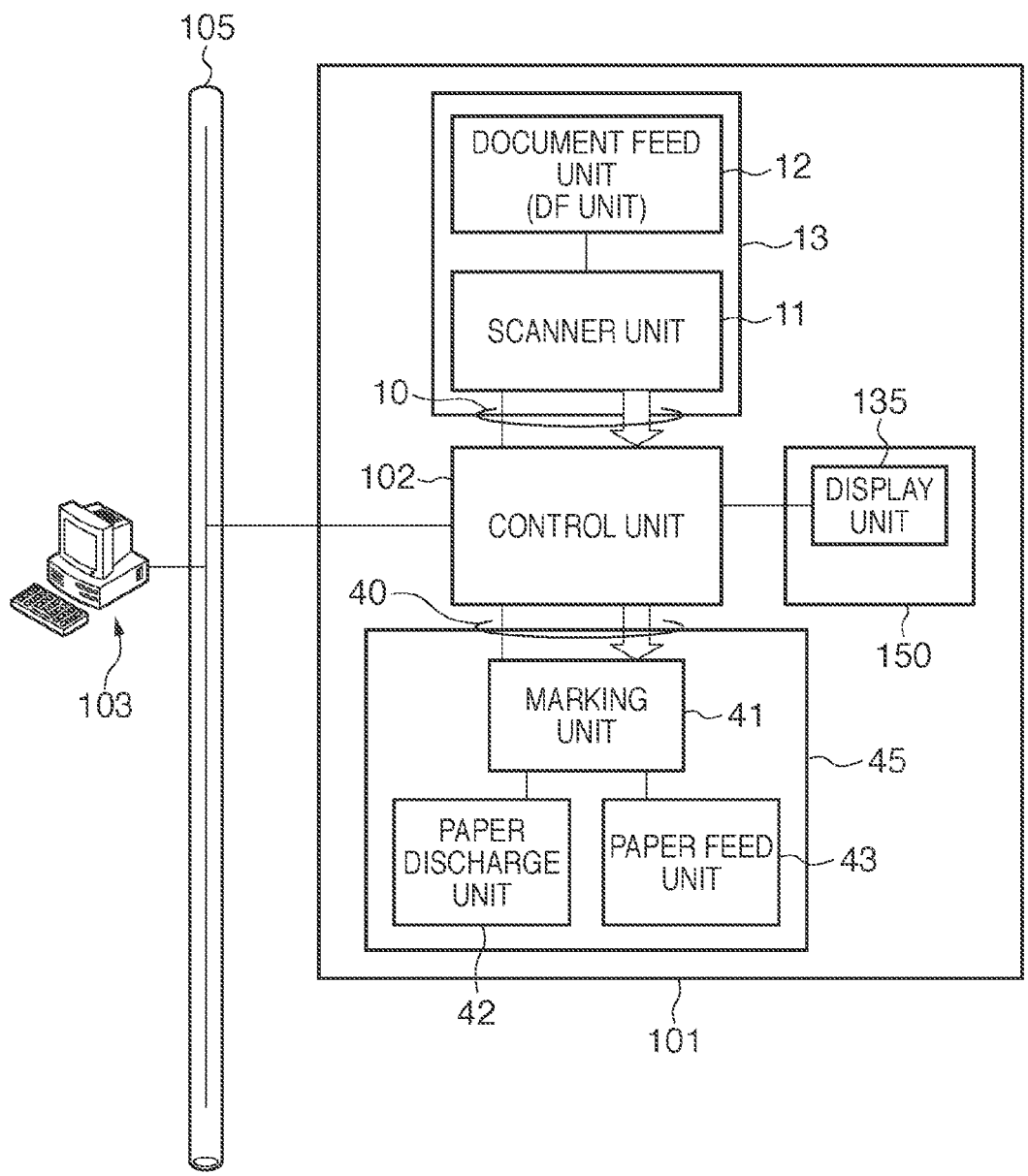
FIG. 1 is a block diagram illustrating the overall configuration of a multifunction peripheral (MFP) according to an embodiment of the present invention.

FIG. 1 is a block diagram illustrating the overall configuration of a multifunction peripheral (MFP) 101 according to an embodiment.

A reader unit 13 reads an image of an original optically and converts the image to image data. The reader unit 13 includes a scanner unit 11 having a function for reading an original document, and a document feed unit 12 having a function for feeding original documents. A printer unit 45 prints the image data on printing paper (a sheet) as a visible image and ejects the printed sheet to the exterior of the apparatus. The printer unit 45 includes a paper feed unit 43 having printing paper cassettes of a plurality of types, a marking unit 41 having a function for printing the image data on the sheet by transferring and fixing the image to the sheet, and a paper discharge unit 42 having a function for sorting, stapling of the printed sheets and ejecting the printed sheets. A control unit 102 is electrically connected to the reader unit 13, printer unit 45 and a console unit 150, and to a personal computer 103 via a network (LAN) 105.

The control unit 102 provides a copy function for reading in image data of an original by controlling the reader unit 13 via a scanner interface 10, and printing image data on a sheet by controlling the printer 45 via a printer interface 40. The control unit 102 further provides a function for transmitting image data, which has been read by the reader unit 13, to another information processing device, such as the personal computer 103, via the network 105. The console unit 150, which is connected to the control unit 102 and has a display unit 135 and various hard keys, provides a user interface for allowing the user to instruct the MFP 101.

Figure 2:
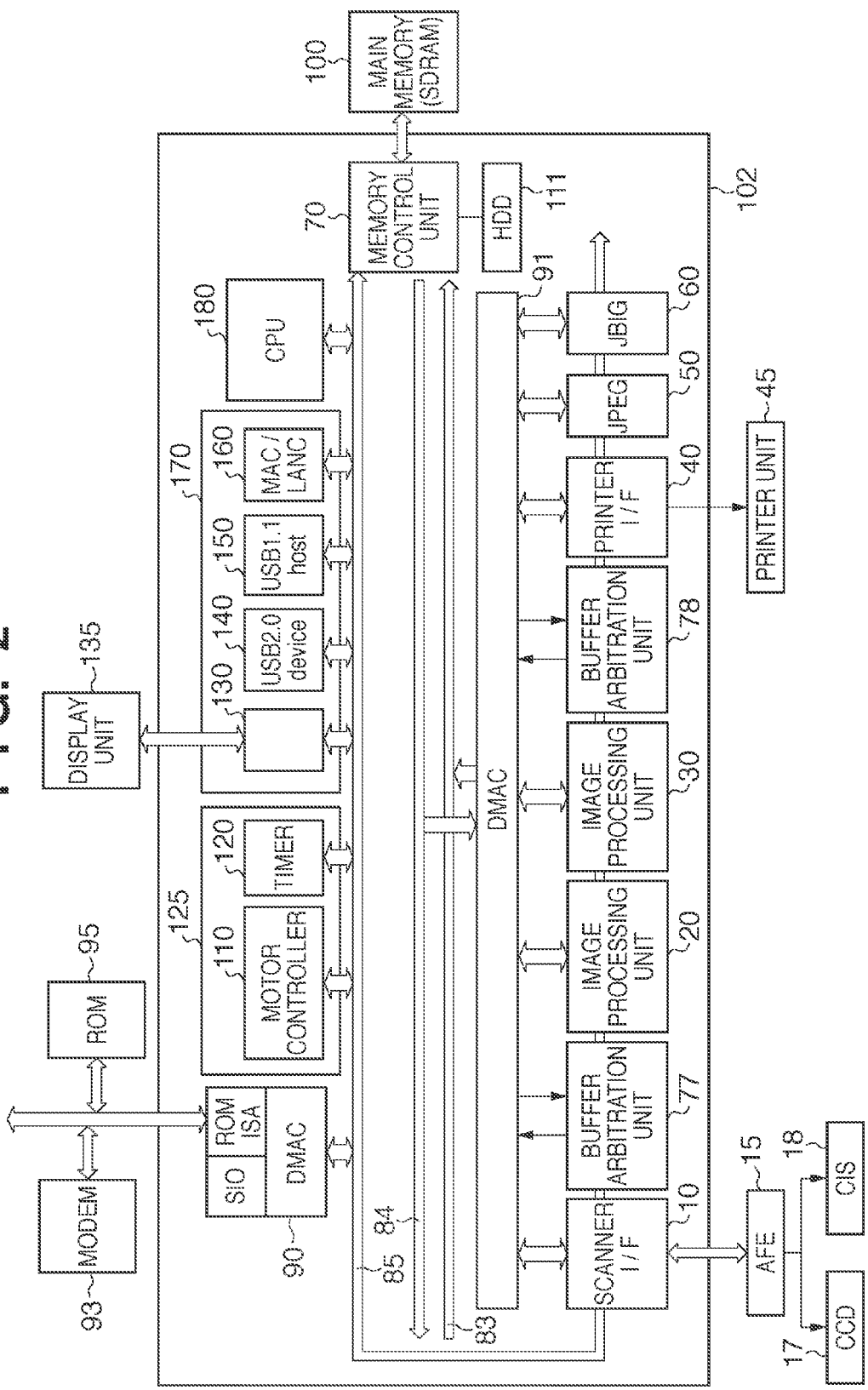
FIG. 2 is a block diagram illustrating the functional structure of a control unit of an MFP according to this embodiment.

FIG. 2 is a block diagram describing the functional structure of the control unit 102.

A CCD 17 and a CIS (contact image sensor) 18 are connected to the scanner interface 10 via an analog front end (AFE) 15 so that image data that has been read by the reader unit 13 is loaded into the control unit 102 without the intervention of a separate special-purpose circuit. The scanner interface 10 is capable of supporting the CCD 17 and CIS 18 and inputs and processes the signals from these image reading devices. The image data thus input and processed is DMA-transferred by a memory control unit 70 and developed in a main memory 100.

An image processing unit 20 subjects the image data, which has been stored in the main memory 100 by the scanner interface 10, to image processing conforming to the operating mode (color copy, monochrome copy, color scan, monochrome scan, etc.). A buffer arbitration unit 77 arbitrates data write and data read in a case where delivery of data between the scanner interface 10 and image processing unit 20 is performed via a ring buffer in the main memory 100. An image processing unit 30 edits the input image data, converts the resolution of the image and outputs the obtained image data to the printer unit 45. The printer interface 40 outputs the image data, which has been processed by the image processing unit 30, to the printer unit 45, such as a laser printer. A buffer arbitration unit 78 arbitrates data write and data read in a case where delivery of data between the image processing unit 30 and printer interface 40 is performed via the ring buffer of main memory 100. Although the buffer arbitration units 77 and 78 have the same basic structure, their control methods differ depending upon the application used. A JPEG module 50 and a JBIG module 60 execute image-data compression and expansion processing compliant with the standards of JPEG and JBIG, respectively.

The memory control unit 70 is connected to first and second buses 83 and 84 relating to image processing and to a computer-related third bus 85 and carries out data transfer control for writing and reading data to and from the main memory 100. A DMA controller 90, in cooperation with the memory control unit 70, is connected to a ROM 95 via ROM ISA (Industrial Standard Architecture) and generates and sets prescribed address information for controlling DMA transfer between external devices and various interfaces 170 and the main memory 100. A DMA controller (DMAC) 91, in cooperation with the memory control unit 70, generates and sets prescribed address information for controlling DMA transfer between the interfaces 10, 40, image processing units 20, 30 and the main memory 100. For example, in accordance with the type of image reading device (CCD 17, CIS 18), the DMAC 91 generates, for every DMA channel, address information for DMA-transferring image data, which has been input from the scanner interface 10, to the main memory 100. Further, together with the memory control unit 70, the DMAC 91 executes DMA control between the image processing units 20, 30 and the main memory 100 for DMA-transferring image data, which has been developed in the main memory 100, to the image processing unit 20. A hard-disk drive (HDD) 111 stores read image data, various settings information and the like in a non-volatile fashion.

The ROM 95 stores suitable control parameters and control program data in accordance with the image reading device (CCD 17, CIS 18). As a result, it is possible to execute input processing of image data conforming to the separate output data formats of the CCD 17 and CIS 18 and it is unnecessary to provide special-purpose interface circuits. Further, since the ROM 95 is capable of storing data in a non-volatile manner, data desired to be preserved will be kept stored in the ROM 95 irrespective of whether the power supply is on or off. The first bus 83 is a bus capable of sending data read out of the main memory 100 to each of the processing units (10 to 60) that are related to image processing. The second bus 84 is a bus capable of sending the main memory 100 the data read out of each of the processing units (10 to 60) relating to image processing. The first and second buses 83, 84 form a pair and implement an exchange of image data between the image processing units and the main memory 100. The third bus 85 is a computer-related bus to which are connected a CPU 180, a communications and user interface control unit 170, a control unit 125 for controlling mechatronics, control registers used in the image processing units, and the DMA controller 90. The control unit 125 includes a motor controller 110 and an interrupt timer 120, which controls the drive timing of a motor and implements timing control for controlling image processing arbitration.

A display controller 130 executes display control for displaying various settings of this MFP and the processing status thereof on a display unit 135. USB (Universal Serial Bus) interfaces 140, 150 enable connection to peripheral devices. A media access control/local application control (MAC/LANC) unit 160 controls at what timing data should be sent to a connected device (namely at what timing the connected device should be accessed). The MAC/LANC unit 160 is used also in case of communication with another device (personal computer 103) via the LAN 105. The CPU 180 controls the overall operation of the MFP 101. A modem 93 is connected to a public line for sending and receiving a facsimile signal.

It should be noted that according to this embodiment, almost all of the image processing is delegated to the personal computer 103 in a case where pull scan and pseudo-push scan are executed. Accordingly, image data that has been scanned in is stored in the main memory 100 of the MFP 101 as is without the read image data being subjected to rotation processing or encoding processing.

Processing in a case where image data is transmitted from the MFP 101 to the personal computer 103 will now be described.

The CPU 180 executes a control program to implement a protocol and transmission specifications that have been stored in the ROM 95. Specifically, the CPU 180 performs such operations as encoding the image data that has been stored in the main memory 100 and appending a packet header to the encoded image data, and transmits the resultant image data to an information processing device (the personal computer 103) on the LAN 105 via the LANC 160. This embodiment utilizes TCP/IP and performs communication for carrying out pseudo-push scan using TCP/IP. A sequence (details of the procedure) for pseudo-push scan will be described later.

Next, the console unit 150 of the MFP 101 according to this embodiment will be described.

The console unit 150 is equipped with the display unit 135 and with keys such as menu selection keys, numeric keys, a reset key, a stop key and a start key. The display unit 135 presents a display based upon control exercised by the display controller 130. The menu selection keys include keys for scrolling up, down, left and right in order to select menu items displayed on the display unit 135, and a key for entering a selected item. The numeric keys are keys for directly inputting numerical values such as number of copies and telephone numbers. The reset key is a key for clearing a state in which setting is currently underway and returning the setting to the initial value. The start key is a key for applying a command to start various jobs. The stop key is a key for applying a command to stop a job that has been started.

A driver executed by the personal computer 103 will be described next.

A sequence executed between the personal computer and the MFP 101 will be described later. Here the read settings of the driver will be described.

Figure 3:
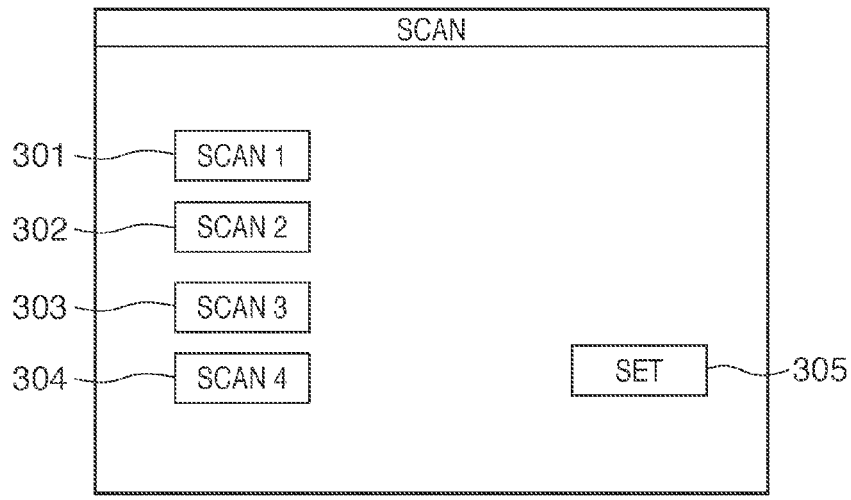
FIG. 3 depicts a view illustrating an example of a user interface screen of a pull-scan driver of a personal computer.

FIG. 3 depicts a view illustrating an example of a UI screen of a pull-scan driver of the personal computer 103.

FIG. 3 illustrates an example of a screen displayed on the display unit of the personal computer 103 in a case where pull scan is performed from the personal computer 103. Buttons 301 to 304 have been assigned profiles as to what type of reading operation will be carried out by operating each button. These profiles are indicated by "SCAN 1" to "SCAN 4". By pressing any one of the buttons among the buttons 301 to 304, a pull-scan command is issued from the personal computer 103 to the MFP 101. In response, the MFP 101 starts reading an original and transmits the read image data to the personal computer 103. The personal computer 103 subjects this image data to processing conforming to the profile.

Figure 4:
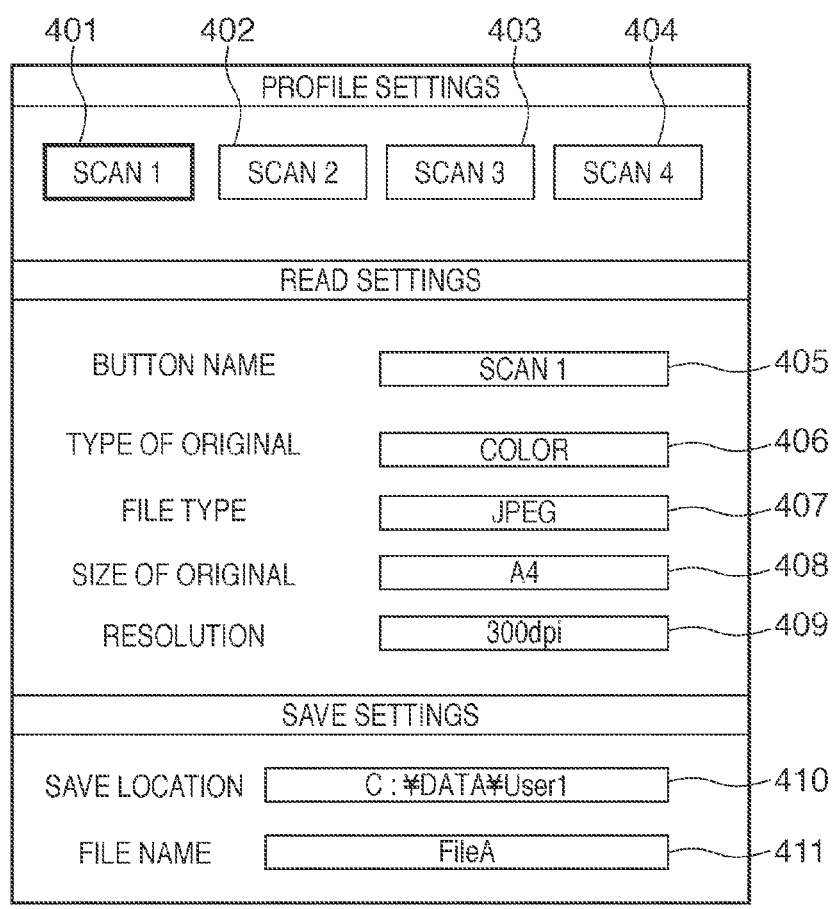
FIG. 4 depicts a view illustrating an example of a user interface screen, which is displayed by a personal computer, for performing read settings.

Next, reference will be had to FIG. 4 to describe what kind of read setting is performed with regard to each of the buttons 301 to 304.

FIG. 4 depicts a view illustrating an example of a UI screen of personal computer 103 for performing read settings. This screen is displayed on the display unit of the personal computer 103 by pressing a "SET" key 305 (see FIG. 3) on the driver screen. FIG. 4 illustrates a state in which a profile that has been set as "SCAN 1" is being displayed in response to pressing of the button 401. If any one of the buttons 401 to 404 is thus pressed, setting values of the profile corresponding to the pressed button will be displayed in fields indicated at 405 to 411. It should be noted that these setting values are setting values that have been input by the user previously or are default setting values. The user can change these setting values to desired values. For example, the profile name ("SCAN 1") in field 405 can be changed to another name. When a profile name is changed, the changed profile name is reflected also on the screen displayed on the display unit 135 of MFP 101. This will be described later. Further, the type of original that will be read can be selected in field 406. In this embodiment, it is assumed that the choices are monochrome, monochrome OCR (Optical Character Recognition), grayscale, color and color (magazine, catalog). In FIG. 4, "COLOR", which specifies reading of a color original, has been selected and set. The format of a file, such as JPEG, TIFF, PDF and BMP, for when scanned-in image data is to be saved is designated in field 407. In FIG. 4, "JPEG" indicative of the JPEG file format has been set. The size of the original to be scanned can be designated in field 408. In FIG. 4, "A4", which represents an A4-size original, has been set. The resolution of the image to be scanned can be designated in field 409. In FIG. 4, "300 dpi (dots per inch)", which specifies a resolution of 300 dpi, has been set. The location (path) where the scanned-in image data is to be saved can be designated in field 410. The name (here "FileA") of the file saved has been designated in field 411.

On the basis of the setting values indicated in fields 406 to 409 described above, image data that has been obtained by scanning is subjected to image processing to thereby obtain the desired image. However, this image processing may be executed by either the MFP 101 or personal computer 103. This embodiment will be described assuming that the image processing is executed by the personal computer 103. It should be noted that with pseudo-push scan, the MFP 101 requests the personal computer 103 to start pull scan. In other words, the MFP 101 requests the user of the personal computer 103 to press any one of the buttons 301 to 304 shown in FIG. 3. If one of these buttons is pressed at the personal computer 103, the personal computer 103 instructs the MFP 101 to start scanning and the MFP 101 executes processing for reading an image on a document and sending the personal computer 103 the image data obtained by reading this image.

Figure 5:
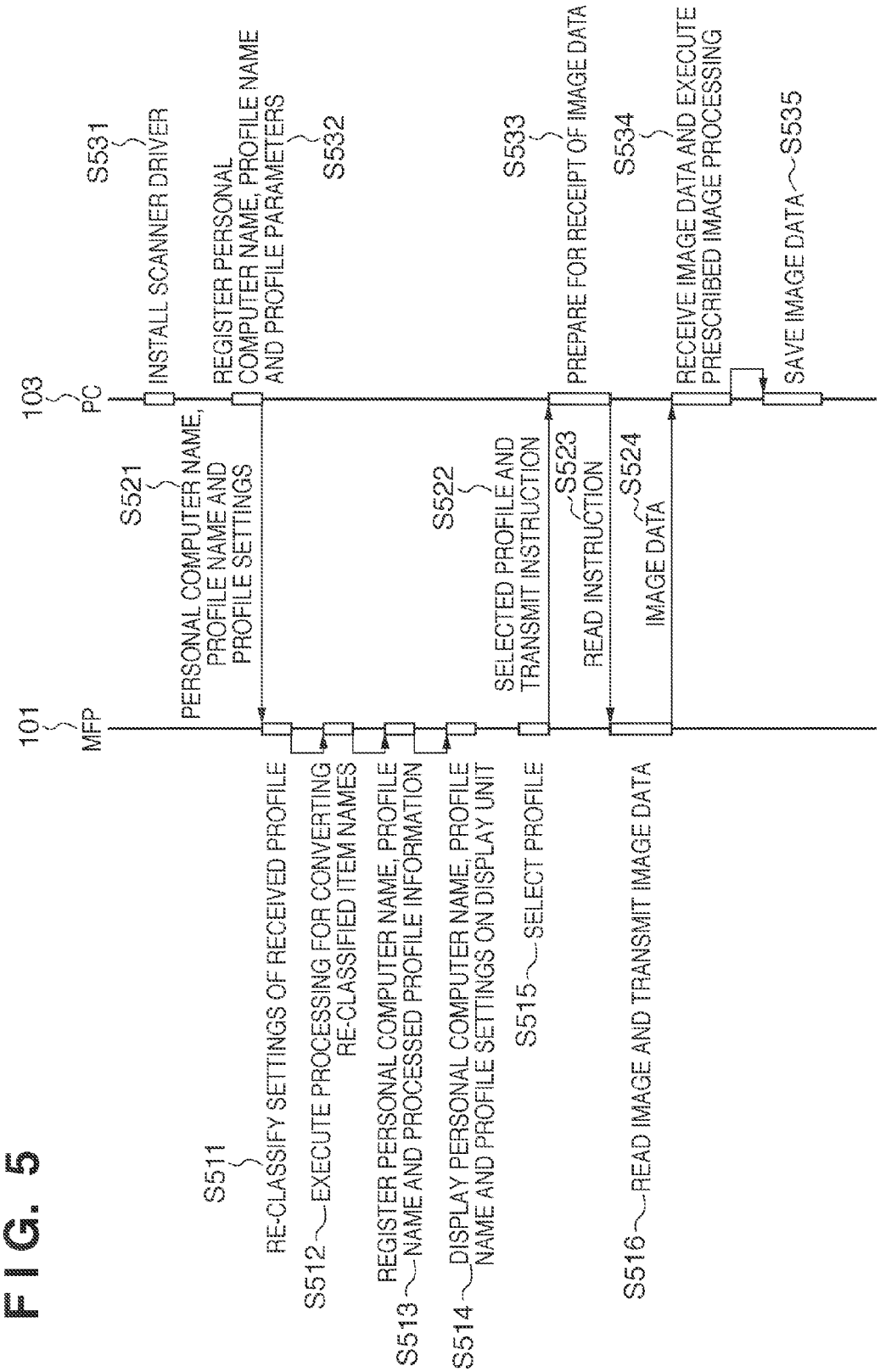
FIG. 5 is a diagram useful in describing a basic data transceive sequence executed between an MFP and a personal computer.

FIG. 5 is a diagram useful in describing a basic data transceive sequence executed between the MFP 101 and personal computer 103 according to this embodiment.

As shown in FIG. 5, S531 indicates a step of installing a pull-scan driver in the personal computer 103. This makes it possible for the personal computer 103 to perform pull scan. It goes without saying that if this driver has been installed in the personal computer 103 beforehand, then this step can be omitted. Next, in S532, the personal computer 103 registers the name of a personal computer, a profile name and the settings (parameters) of the profile and transmits these to the MFP 101 in S521. This processing is executed at any of the following times, by way of example:

the time at which the driver is installed in the personal computer 103, or the time at which the personal computer 103 is started up;

the time at which the settings of a profile of the driver of personal computer 103 are changed; and the time at which there is a change in the logged-on user in a case where the personal computer 103 has a multiuser interface, as with Microsoft's Windows (registered trademark), by way of example.

The content transmitted in S521 includes the name of the personal computer, the profile name and the profile settings. Further, in a case where a plurality of profiles exist, as illustrated in FIG. 3, the plurality of program files are transmitted in amounts equivalent to the profiles indicated at buttons 301 to 304 in FIG. 3. Through the processing described above, the MFP 101 is notified of the profile that has been set by the personal computer 103.

In S511, the MFP 101 receives the information transmitted from the personal computer 103 and re-classifies the settings of the profile, which are contained in this information, for the purpose of displaying the settings on the MFP 101. In step S512, the re-classified item names are converted to item names at the MFP 101. The reason for this is as follows: Since the profile setting screen of the personal computer 103 shown in FIG. 4 generally has enough space for displaying characters and comments, settings can be made upon displaying the details of each item, thereby enhancing operability for the user. With regard to the display unit 135 of the MFP 101, however, if the number of characters capable of being displayed by the display unit 135 is small, then it is considered better to display the profile attributes using smaller characters because this enhances user friendliness by making it easier to view the profiles. Furthermore, grouping a display of several items within an area capable of being comprehended by the user also is effective in terms of limiting the number of characters. Accordingly, in S511 and S512, the MFP 101 re-classifies the profile settings for the purpose of displaying them on the MFP 101 and converts the item names to item names displayed on the MFP 101. The details of this processing will be described later.

Next, in S513, the name of the personal computer, the profile name, the re-classified items and the converted items names obtained by the processing in S511 and S512 are stored in the MFP 101. These items of information are stored on the hard-disk drive 111. Next, in S514, the name of the personal computer, the profile name and the profile settings are displayed on the display unit 135. Here a menu screen that enables the content stored in S513 to be displayed in the form of a selection menu on the display unit 135 is formed. At this time the MFP 101 displays the screens shown in FIG. 6 on the display unit 135. The screens of FIG. 6 will be described later together with a flowchart that describes the processing executed by the MFP 101.

Next, in S515, the user selects a profile (see FIG. 6) displayed on the display unit 135 and, using the MFP 101, requests the personal computer 103 to perform pull scan. In S522 the pull-scan instruction to the personal computer 103 and the profile selected in S515 are transmitted. In response, the personal computer 103 receives the pull-scan start request from the MFP 101 in S533 and proceeds to execute pull-scan processing. Here, based upon the content transmitted from the MFP 101 in S522, the personal computer 103 determines which of the profiles indicated at buttons 301 to 304 of FIG. 3 is to be used to start pull scan. In S523, the personal computer 103 notifies the MFP 101 of the instruction to start scanning. In response, the MFP 101 reads the original in S516 based upon the content instructed in S523 and acquires the image data representing the image of the original. The MFP 101 transmits the image data read in S516 to the personal computer 103 in S524. In response, in S534, the personal computer 103 receives the image data transmitted in S524 and executes image processing based upon the parameters of the profile transmitted in S522. Further, in this embodiment, a folder on the hard disk of the personal computer 103 has been designated at the fields 410 and 411 in FIG. 4 as the destination where the image data is to be saved. In S535, therefore, the personal computer 103 stores the image data, which has undergone image processing, in the folder that has been designated on the screen of FIG. 4.

FIG. 7 is a flowchart describing processing executed by the MFP 101 according to this embodiment. It should be noted that the program for executing this processing has been stored in the memory 100 or ROM 95 and is executed under the control of the CPU 180.

First, in step S1, the CPU 180 determines whether the occurrence of an event is due to receipt of information (name of a personal computer+profile name+profile settings) from the personal computer 103 (S521 in FIG. 5) or to an operation performed by a user. If the event is receipt of information from the personal computer 103, then control proceeds to step S2. Here, based upon the settings of the profile received in step S1, the CPU 180 discriminates the type of original that is to be read. The type of original has been set in the field 406 of FIG. 4. Profiles received from the personal computer 103 may be plural in number. In this embodiment, it is assumed that only information concerning the type of original is displayed as a profile setting on the display unit 135 of MFP 101. In step S2, therefore, only the type of original is discriminated and control proceeds to step S4 if the type of the original is monochrome, monochrome (OCR) or grayscale, or to step S3 if the type is color or color (magazine, catalog). In step S3, the CPU 180 generates character strings, which are displayed on the display unit 135, based upon the name of the personal computer, the profile name and the profile settings. Here the type of original is color or color (magazine, catalog) and therefore the character string "COLOR" is generated. In step S4 also, the CPU 180 generates character strings, which are displayed on the display unit 135, based upon the name of the personal computer, the profile name and the profile settings. Here, however, the type of original is monochrome, monochrome (OCR) or grayscale and therefore the character string "MONOCHROME" is generated. It should be noted that although the character strings generated in step S3 or S4 differ from the content displayed on the personal computer 103, they are character strings that enable at least the name of the personal computer, the profile name and the profile settings to be identified. When step S3 or S4 has thus been executed, control proceeds to step S5. Here the CPU 180 stores the character strings, which have been created in step S3 or S4, on the hard-disk drive 111. Control then returns to step S1.

If it is determined in step S1 that a user operation has been performed, control proceeds to step S6. From this step onward, the CPU 180 executes processing for the case where pseudo-push scan has been selected using the console unit 150. First, the name of the personal computer stored in step S5 is displayed in step S6.

Figure 6:
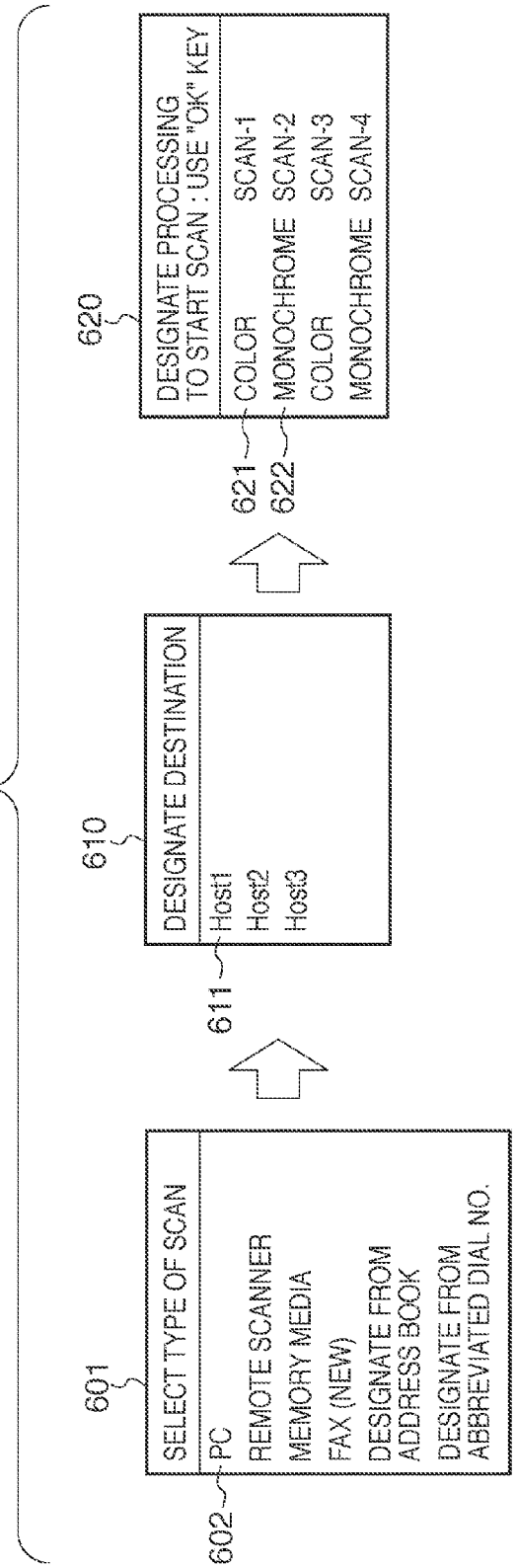
FIG. 6 is a diagram illustrating an example of screens, which are displayed by an MFP, for selecting scan functions and personal computers.

FIG. 6 depicts a view illustrating an example of screens, which are displayed by the MFP 101, for selecting scan functions and personal computers according to this embodiment.

If "PC" (personal computer) is selected on a scan-function selection screen 601 in FIG. 6, as indicated by 602, a selection screen 610 for selecting a personal computer is displayed. The PC selection screen 610 displays character strings conforming to the character strings of names of personal computers created in step S3 or S4, these being displayed as choices (names of personal computers). In the example of FIG. 6, names "Host 1", "Host 2" and "Host 3" of three personal computers are being displayed. Next, in the flowchart of FIG. 7, control proceeds to step S7. Here the CPU 180 senses input from a hard key on the console unit 150 and recognizes which personal computer has been selected. In FIG. 6, it is assumed that "Host 1" (which corresponds to the personal computer 103) indicated at 611 has been selected. Next, control proceeds to step S8 and the CPU 180 displays the profile names possessed by the personal computer 103 selected.

With reference to FIG. 6, when the personal computer "Host 1" indicated by 611 is selected on the PC selection screen 610, a profile selection screen 620 of the personal computer 103 is displayed. Character strings (profile names and profile settings) created in step S3 or S4 are displayed on the profile selection screen 620. Further, a character string generated in step S3 is displayed as "SCAN 1" together with "COLOR", as indicated by 621 in FIG. 6. In addition, a character string generated in step S4 is displayed as "SCAN 2" together with "MONOCHROME", as indicated by 622 in FIG. 6. It should be noted that the type "MONOCHROME" of the original, which corresponds to "SCAN 2", has been set using the screen shown in FIG. 4. Next, control proceeds to step S9, where the CPU 180 senses an input from a hard key on the console unit 150 and obtains information as to which profile has been selected by the user. The MFP 101 re-classifies the settings of the profiles, which have been set by the personal computer, to "COLOR" and "MONOCHROME" for the purpose of display on the MFP 101, converts these item names to item names ("COLOR SCAN-1", "MONOCHROME SCAN-2", etc.) displayed by the MFP 101, and then displays these converted item names.

In step S10, the CPU 180 determines whether or not the start key on the console unit 150 has been pressed, and control proceeds to step S11 if the start has been pressed. In step S11, the CPU 180 issues a transmit request to the personal computer selected in step S7 (assumed here to be "Host 1", namely the personal computer 103) so as to cause this device to perform pull scan. At this time the CPU 180 also transmits information as to which profile possessed by the driver in the personal computer 103 is to be used to perform pull scan. In step S12, the CPU 180 waits for receipt of a pull-scan instruction (image-transmit request) issued from the personal computer 103. When the pull-scan instruction is received, control proceeds to step S13 and the CPU 180 controls the reader unit 13 to thereby scan the original and obtain image data representing the original (S516 in FIG. 5). Then, in step S14, the CPU 180 transmits this image data to the personal computer 103 as indicated in S524 in FIG. 5.

FIG. 8 is a flowchart describing processing executed by the personal computer 103 according to this embodiment. The program for executing this processing has been installed on the hard-disk drive (not shown) of the personal computer 103. At execution the program is loaded into the computer memory (not shown) and is executed under the control of the computer CPU (not shown).

First, in step S21, the pull-scan driver is installed in the personal computer 103. Once the driver has been installed, step S21 need not be executed again and can be omitted as long as the driver is explicitly erased. Next, control proceeds to step S22 and the personal computer 103 waits for the occurrence of various events. The types of events awaited are as follows:

start-up of the personal computer 103 or a change in logged-on user;

a request to set or change the profile of the pull-scan driver; and a prompt (notification) from the MFP 101 to perform pull scan.

In step S22, control proceeds to step S23 if setting of a profile of the pull-scan driver or a change in the profile has been requested. In step S23, the personal computer 103 stores the information that has been set in fields 405 to 411 of FIG. 4, this information having been set or changed by the user. Control then proceeds to step S24. Here the personal computer 103 transmits the name of the personal computer, the profile name and the profile settings to the MFP 101 in order to create a menu (FIG. 6) displayed on the MFP 101 at the time of pseudo-push scan (this step corresponds to S521 in FIG. 5).

If the event in step S22 is start-up of the personal computer 103 or a change in logged-on user, on the other hand, then control proceeds to step S24. This step is processing for notifying the MFP 101 of the profile information possessed by the personal computer 103 and creating a menu (FIG. 6) displayed at the time of pseudo-push scan.

If the event in step S22 is a prompt (notification) from the MFP 101 to perform pull scan, then control proceeds to step S25. Here the personal computer 103 receives a pull-scanstart request from the MFP 101 as well as the selected-profile information in the case where pull scan is performed (this corresponds to S522 of FIG. 5). On the basis of the information received, the personal computer 103 selects the profile, which corresponds to the profile selected by the MFP 101, from among the profiles 301 to 304 (FIG. 3). Next, in step S26, the personal computer 103 transmits a scan instruction to perform pull scan to the MFP 101 based upon the setting made in step S25 (step S523 in FIG. 5). The personal computer 103 then waits for transmission of image data from the MFP 101. When the image data is received in step S27, control proceeds to step S28 and the personal computer 103 accepts the image data from the MFP 101. Control then proceeds to step S29, at which the personal computer 103 subjects the image data received in step S28 to image processing based upon the profile settings, for the case where pull scan is performed, received from the MFP 101 in step S25. Finally, in step S30, by referring to the storage location (field 410 in FIG. 4) and file name (field 411 in FIG. 4) of the image data of the profile corresponding to the profile selected by the MFP 101, the personal computer 103 stores the image processed in step S29 in the set location upon attaching the file name to the image data.

Although a network (TCP/IP) is used as the communication means in this embodiment, similar processing is applicable even with other communication means such as a USB.

Further, in this embodiment, the type of original is presented as an example of a profile setting displayed on the display unit 135 of MFP 101. It goes without saying, however, that similar processing can be executed with other parameters as well. For example, there are a plurality of types, such as file type [JPEG (Joint Photographic Experts Group) or PDF (Portable Document File)], original size (A4, A3) and resolution. Further, it may be arranged so that the user, by using the pull-scan driver screen (FIG. 4), can select which parameters are to be displayed on the display unit 135, namely the parameters to be displayed.

Further, in this embodiment, character strings "COLOR" and "MONOCHROME" are presented as examples of profile settings displayed on the display unit 135 of MFP 101. However, these settings may be displayed as graphical icons if allowed by the capabilities of the display unit 135.

Thus, in accordance with this embodiment as described above, profile settings are displayed together with a profile name when a profile is selected using the user interface of an MPU. As a result, the user can confirm the format of an output image while he or she is in front of the device. This enhances convenience because it prevents a situation in which the user first notices a mistake in scanning results upon returning to the personal computer.

Further, unlike the image parameter display screen of a personal computer, the user interface of an inexpensive MFP has many limitations and often cannot display long character strings or use graphical icons. In accordance with this embodiment, however, this problem is solved because a display suited to an MFP can be presented by the MFP by changing the display of profile settings depending upon whether the display is presented by the personal computer or MFP. This makes it easier for the user to recognize a profile and results in fewer mistakes.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-149181, filed Jun. 23, 2009, which is hereby incorporated by reference herein in its entirety.

What is claimed is:

1. An image reading apparatus comprising:
a reading unit configured to read an original and generate image data representing the original;
a communication unit configured to communicate with an information processing device;
an acquisition unit configured to acquire, by using the communication unit, a profile capable of being set as processing for reading the original and generating the image data by the reading unit and transmitting the generated image data;
a display control unit configured to re-classify settings of the profile, which has been acquired by the acquisition unit, for the purpose of display on a display unit of the image reading apparatus, and to cause an item that has been generated based upon the re-classified settings to be displayed on the display unit;
a transmission unit configured to, based upon selection of the item displayed on the display unit by the display control unit, transmit information of the profile corresponding to this item to the information processing device; and
an image transmission unit configured to transmit the image data generated by the reading unit to the information processing device in accordance with a request, which is transmitted from the information processing device, for transmission of the image data.

2. The apparatus according to claim 1, wherein the acquisition unit is able to acquire a plurality of profiles.

3. The apparatus according to claim 1, wherein the item displayed by the display control unit includes an item name different from an item name of a character string representing settings of the profile displayed on the information processing device.

4. The apparatus according to claim 1, wherein the item displayed by the display control unit includes an icon corresponding to the profile and the settings.

5. The apparatus according to claim 1, wherein the item displayed on the display unit includes a profile name and the re-classified settings.

6. The apparatus according to claim 1, wherein the profile includes at least one of (i) a type of document which is to be read by the reading unit, (ii) a file format of a file in which the generated image data is to be stored, (iii) a size of document which is to be read by the reading unit, and (iv) a reading resolution of the reading unit.

7. The apparatus according claim 1, wherein the acquisition unit acquires the profile transmitted from the information processing device at one or more of the following times: (i) when a scan driver for reading an original is installed in the information processing device, (ii) when the information processing device is started up, (iii) when the profile has been changed in the information processing device, and (iv) when a logged-on user of the information processing device has been changed.

8. A method of controlling an image reading apparatus capable of implementing scan in cooperation with an information processing device, the method comprising:

an acquisition step of acquiring a profile capable of being set with regard to processing for reading an original and generating image data and transmitting the generated image data;

a display control step of re-classifying settings of the profile, which has been acquired in the acquisition step, for the purpose of display on a display unit of the image reading apparatus, and causing an item that has been generated based upon the re-classified settings to be displayed on the display unit;

a transmission step of, based upon selection of the item displayed on the display unit in the display control step, transmitting information of the profile corresponding to this item to the information processing device;

a reading step of reading an original and generating image data representing the original in accordance with a request for transmission of the image data, which is transmitted from the information processing device; and an image transmission step of transmitting the image data generated in the reading step to the information processing device.

9. A non-transitory computer-readable storage medium storing a program for causing a computer to function as an image reading apparatus comprising:

a reading unit configured to read an original and generate image data representing the original;

a communication unit configured to communicate with an information processing device;

an acquisition unit configured to acquire, by using the communication unit, a profile capable of being set as processing for reading the original and generating the image data by the reading unit and transmitting the generated image data;

a display control unit configured to re-classify settings of the profile, which has been acquired by the acquisition unit, for the purpose of display on a display unit of the image reading apparatus, and to cause an item that has been generated based upon the re-classified settings to be displayed on the display unit;

a transmission unit which, based upon selection of the item displayed on the display unit by the display control unit, is configured to transmit information of the profile corresponding to this item to the information processing device; and an image transmission unit configured to transmit the image data generated by the reading unit to the information processing device in accordance with a request, which is transmitted from the information processing device, for transmission of the image data.

* * * * *